(12) United States Patent
Humm et al.

(10) Patent No.: US 6,659,679 B2
(45) Date of Patent: Dec. 9, 2003

(54) DEVICE FOR FASTENING A CATHODE RAY TUBE ON A COVERING FRAME

(75) Inventors: Helmut Humm, Obermichelbach-Rothenberg (DE); Gottfried König, Bad Laasphe (DE)

(73) Assignee: EJOT Verbindungstechnik GmbH & Co. KG, Bad Laasphe (DE)

( * ) Notice: Subject to any disclaimer, the term of this patent is extended or adjusted under 35 U.S.C. 154(b) by 0 days.

(21) Appl. No.: 10/160,291

(22) Filed: Jun. 4, 2002

(65) Prior Publication Data

US 2003/0044224 A1 Mar. 6, 2003

(30) Foreign Application Priority Data

Jun. 5, 2001 (DE) .......................................... 101 27 167

(51) Int. Cl.⁷ .................................................. F16B 5/04
(52) U.S. Cl. ....................... 403/343; 403/367; 403/280; 348/826
(58) Field of Search ................................. 403/365, 367, 403/366, 368, 343, 256, 257, 258, 262, 280, 370, 373, 282, 374.1, 374.2; 348/826

(56) References Cited

U.S. PATENT DOCUMENTS

| 4,646,159 A | * | 2/1987 | Beaumont et al. | ........... 348/836 |
| 5,363,150 A | * | 11/1994 | Kojima | ........................ 348/836 |
| 5,374,136 A | * | 12/1994 | LaPlante | ..................... 403/370 |
| 5,844,635 A | * | 12/1998 | Kim | ............................ 348/826 |

FOREIGN PATENT DOCUMENTS

| DE | 77 17 562 | 10/1977 |
| DE | 92 12 532.8 | 11/1993 |
| DE | 298 12 947 | 1/2000 |
| DE | 198 60 085 | 6/2000 |
| EP | 302 026 | 2/1989 |
| EP | 632 205 | 1/1995 |
| EP | 658 049 | 6/1995 |
| GB | 2336623 | 10/1999 |
| GB | 2344136 | 5/2000 |

* cited by examiner

*Primary Examiner*—John R. Cottingham
(74) *Attorney, Agent, or Firm*—Banner & Witcoff, Ltd.

(57) ABSTRACT

The invention relates to a device for fastening a cathode ray tube on a covering frame, in the case of which a flat flange which is fastened on the cathode ray tube and is provided with a bore is screwed to the covering frame by a screw, via an internal thread. Arranged between the covering frame and flange is a compensating element which, in a position which is determined by the cathode ray tube butting against the covering frame, can be fixed in relation to the covering frame in that the compensating element interacts with an internal-thread-containing guide part of the covering frame. By virtue of the screw being screwed into the guide part, the compensating element, by virtue of the guide part being widened in the region of said compensating element, can be clamped firmly on the guide part in that the guide part is of tubular configuration with at least one longitudinal slit and is enclosed by the compensating element, against which the guide part presses, when the screw is screwed in, with the longitudinal slit or slits widening in the process.

12 Claims, 2 Drawing Sheets

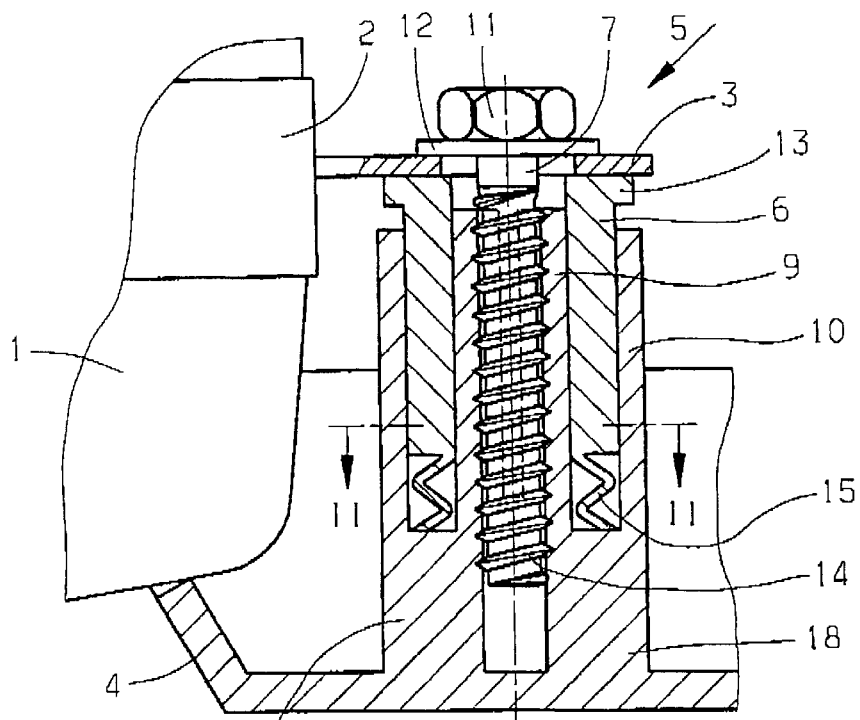
Fig. 1
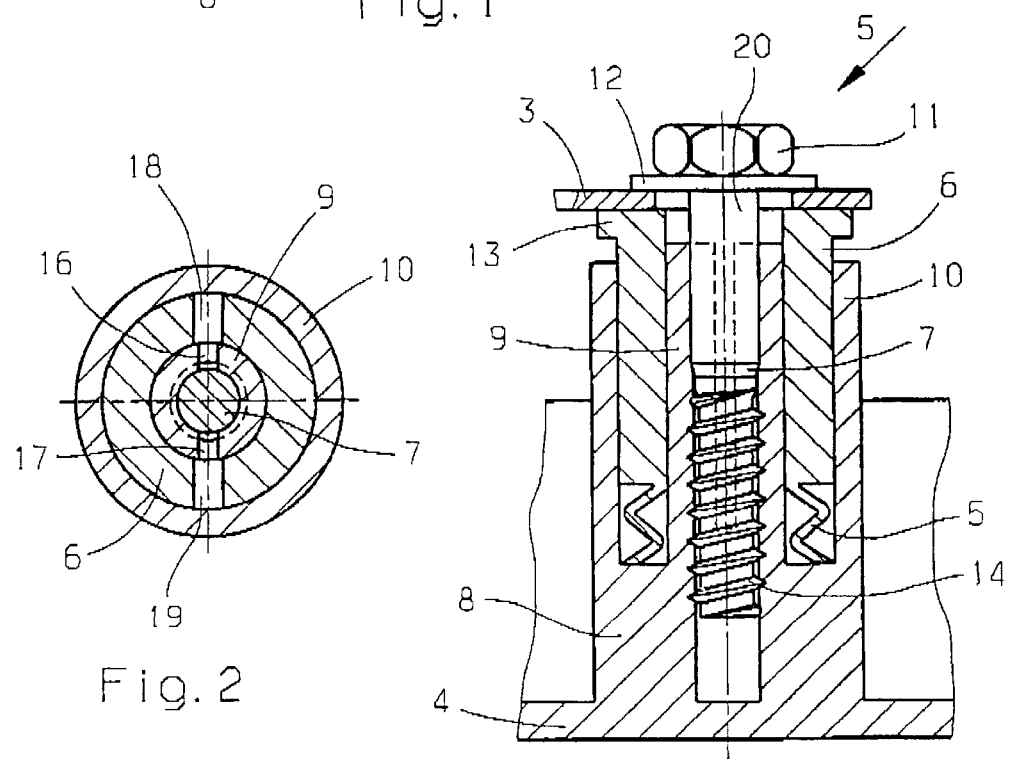
Fig. 2
Fig. 3

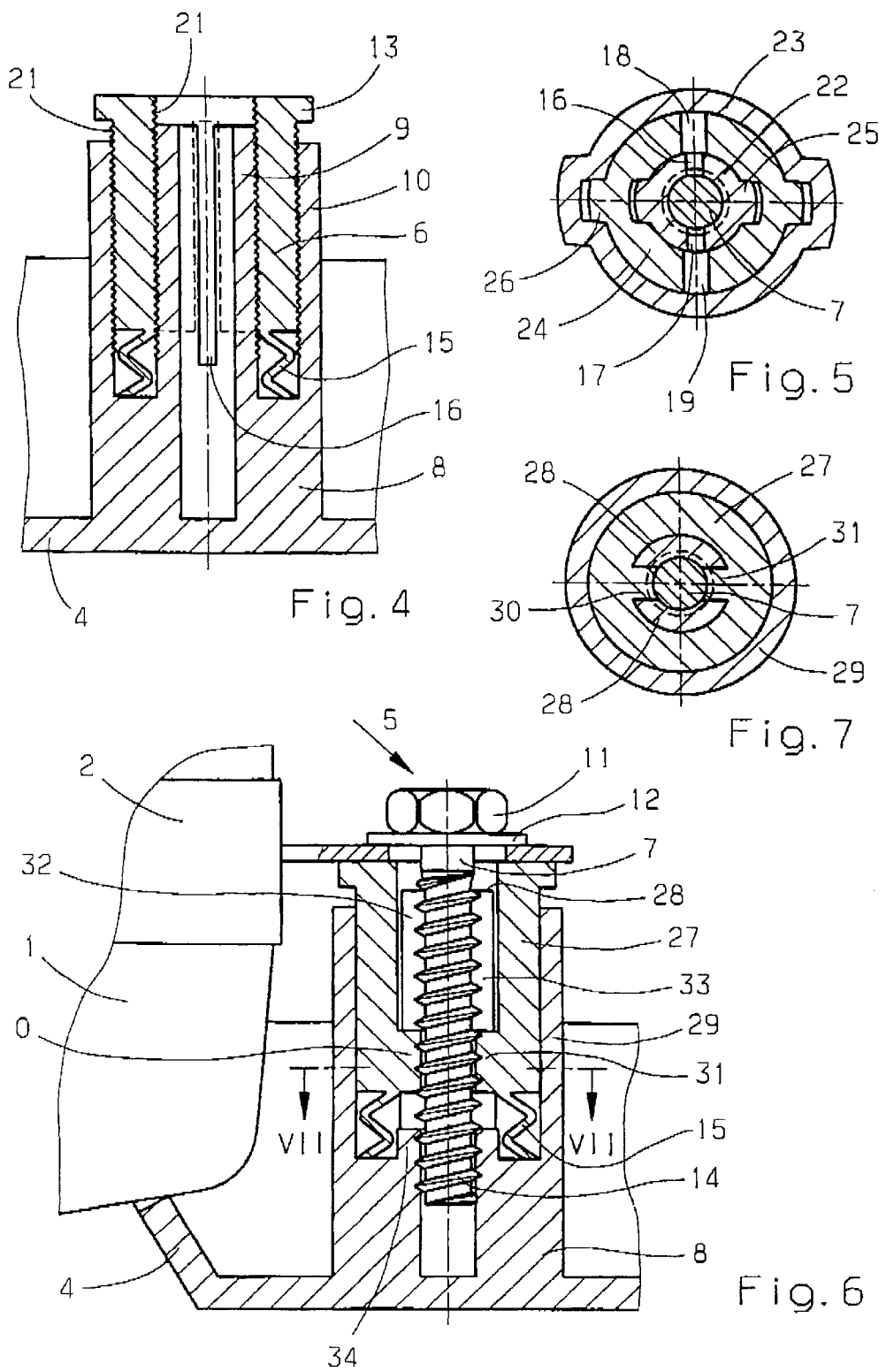

DEVICE FOR FASTENING A CATHODE RAY TUBE ON A COVERING FRAME

The invention relates to a device for fastening a cathode ray tube on a covering frame, in the case of which a flat flange which is fastened on the cathode ray tube and is provided with a bore is screwed to the covering frame by a screw, via an internal thread, there being arranged between the covering frame and flange a compensating element which, in a position which is determined by the cathode ray tube butting against the covering frame, can be fixed in relation to the covering frame in that the compensating element interacts with an internal-thread-containing guide part of the covering frame.

Such a device is known from European Patent 302026 B1. This device is intended to achieve two things. On the one hand, the intention is to prevent the guide part and the compensating element from rotating relative to one another in order to ensure that the screw is tightened, this being achieved in that the compensating element is divided up into a multiplicity of shaped sectors, of which each is introduced into a corresponding cavity in the guide part. As the figures of the European patent show, this results in a complicated design with the individual parts having a multiplicity of interengaging branches. On the other hand, the intention is to prevent the situation where, when the screw is placed in position, it cannot initially press onto the compensating element since in this case the compensating element, of which the position assumed under the stressing of the spring element between the covering frame and flange is responsible for securing the cathode ray tube, with allowance being made for tolerances in the process, could be deliberately forced out of position. In the case of the subject matter of the European patent, however, this last requirement is only fulfilled when the screw is actually inserted centrally into the device rather than in a somewhat skewed manner, which can never be ruled out in the case of quick assembly.

The object of the invention is to provide a device of the type specified in the introduction in the case of which displacement of the compensating element during insertion of the screw is more or less ruled out and the device as a whole is of simplified design.

This problem is solved according to the invention in that, by virtue of the screw being screwed into the guide part, the compensating element, by virtue of the guide part being widened in the region of said compensating element, can be clamped firmly on the guide part in that the guide part is of tubular configuration with at least one longitudinal slit and is enclosed by the compensating part, against which the guide part presses, when the screw is screwed in, with the longitudinal slit or slits widening in the process.

In the case of this configuration, the compensating element is only influenced by the screw when the screw, as it is screwed into the guide part, widens the latter and thus clamps the compensating element firmly on the guide part. This avoids displacement of the compensating element when the screw is placed in position and screwed in since the compensating element is clamped firmly as the screw is screwed into the guide part. The introduction of the screw into the guide part thus immediately ensures firm clamping of the compensating element in its assumed position, which is determined by the respective position of the covering frame in relation to the flange. Full allowance is thus made for the tolerances determining this position here by way of the position assumed by the compensating element, and this position is also retained in a stable manner on account of the firmly clamped compensating element, with the result that the cathode ray tube is secured in a solid manner on its covering frame.

In order, for the operation of inserting a cathode ray tube into a covering frame, to provide the compensating element with the ability to move, while remaining in abutment against the flange, the compensating element is expediently assigned a spring element which presses the compensating element against the flange. If, during insertion of the cathode ray tube, a certain amount of tilting then initially occurs on individual fastening devices, and this tilting is then eliminated with the definitive insertion operation, the compensating element, under the action of the stressing of the spring element, can follow this movement and thus remains constantly in contact with the flange.

On the one hand, the internal thread in the guide part may expediently be produced by a self-tapping screw; on the other hand, however, it is also, of course, possible for the internal thread to be preformed with underdimensioning.

The widening of the guide part may be produced, on the one hand, by the thread of the screw or by a screw-shank part which is provided, with overdimensioning in relation to the guide part, as a constituent part of the screw.

A particularly straightforward design is achieved in that the guide part has an inner tube and an outer tube, coaxial with the inner tube, with an annular space which is located between the two tubes and is essentially filled by the likewise tubular compensating element.

In order to provide specific and additional securing for the axial positions of the inner tube or guide part and the compensating element relative to one another, passing through the longitudinal slit or slits are one or more respective protrusions which belong to the compensating elements and extend into the region of the internal thread and continue the latter. This means that the screw is retained not just by the inner tube (as a constituent part of the guide part) but also by the protrusions of the compensating element, with the result that those regions of the screw thread which are in connection with the inner tube and the protrusions ensure that these regions and thus the inner tube and protrusions are secured at a defined spacing given by the thread of the screw, irrespective of how far the screw is screwed in.

In order also for the compensating element to be provided with a certain amount of radial elasticity, the compensating element may expediently be provided with one or more longitudinal slits. This makes it possible for the compensating element, when the screw is screwed in, to expand radially together with the inner tube and to be supported against the outer tube and thus to be clamped in relation to the latter.

In order to intensify the clamping between the inner tube and compensating element and/or compensating element and outer tube, the inner tube is expediently configured such that it has radial noses which have an outwardly decreasing cross section and project into corresponding recesses in a compensating element. Correspondingly, it is then also possible for the compensating element to be provided with radial noses which have an outwardly decreasing cross section and project into corresponding recesses in the outer tube of the guide part. The noses are then expediently configured such that the noses of the inner tube and the noses of the compensating element are oriented essentially in the same radial direction.

The retaining forces between inner tube, compensating element and outer tube can be further intensified in that those surfaces of the inner tube and compensating element and also of the compensating element and outer tube which are in contact with one another have a surface structure which makes relative displacement more difficult. This surface structure may be provided by roughening or knurling or the like.

Exemplary embodiments of the invention are illustrated in the figures, in which:

FIG. 1 shows a section through the device with cathode ray tube and covering frame;

FIG. 2 shows a section along line II—II from FIG. 1;

FIG. 3 shows a modification of the device according to FIG. 1 with a screw-shank part which causes the guide part to be widened;

FIG. 4 shows a device corresponding to that according to FIG. 1, but with compensating element and guide part having a surface structure which makes displacement more difficult;

FIG. 5 shows a configuration corresponding to that according to FIG. 2, in the case of which the inner tube and the compensating element are provided with radial noses;

FIG. 6 shows a modification of the device according to FIG. 1, with the compensating element having protrusions into which the thread of the screw engages; and FIG. 7 shows a section along line VII—VII from FIG. 6.

FIG. 1 illustrates part of a cathode ray tube 1 for a television set, the sheet-metal frame 2 being clamped around the cathode ray tube. Fastened on the sheet-metal frame 2 is the flange 3, which is provided with a bore, projects away from the sheet-metal frame 2 and serves for fastening the cathode ray tube 1 on the covering frame 4, into which the cathode ray tube 1 is inserted.

The device 5 is provided for connecting the flange 3 to the covering frame 4, said device essentially comprising the compensating element 6 and the screw 7. The compensating element 6 is inserted into the guide part 8, out of which the inner tube 9 and the outer tube 10 project. The annular space which is formed by the inner tube 9 and the outer tube 10, and is located between these tubes, is essentially filled by the compensating element 6. The screw 7 is screwed into the inner tube 9, is supported on the flange 3 by way of its screw head 11, via the washer 12, and draws said flange against a collar 13 of the compensating element 6.

This configuration is based on the following functioning: the cathode ray tube 1 is inserted, as usual, into the covering frame 4, in which case it is supported against the covering frame 4. Unavoidable tolerances between the supporting location of the cathode ray tube 1 on the covering frame 4 and the position of the flange 3 here result in a greater or lesser spacing between the flange 3 and the end sides of the inner tube 9 and of the outer tube 10, which is set by the compensating element 6 with automatic adaptation to the respective position of the flange 3. When the cathode ray tube 1 is placed in position on the covering frame 4, the flange 3 presses onto the compensating element 6, which is initially seated in an easily displaceable manner between the inner tube 9 and the outer tube 10, and pushes said compensating element into the annular space between the two tubes 9 and 10 until the cathode ray tube 1 butts against the covering frame 4. In this relative position, the flange 3 is then secured in that, upon reaching the thus adapted position of the cathode ray tube 1 and flange 3, the screw 7 is screwed into the inner tube 9, the latter widening, on account of a corresponding diameter of the thread 14 of the screw 7 and of a corresponding internal diameter of the inner tube 9, and thus securing the compensating element 6 in a press fit between inner tube 9 and the outer tube 10. This operation of screwing in the screw 7 merely results in a radial expansion of the inner tube 9, without the flange 3 being subjected to any particular axial force at the same time. Reaching the end position of the screw 7, namely when the screw head 11 is pressed onto the flange 3, then results in a firm connection between the screw 7, inner tube 9, compensating element 6 and outer tube 10 in relation to the flange 3, as a result of which the cathode ray tube 1 is secured in the covering frame 4 without axial stressing.

Inserting the cathode ray tube 1 into the covering frame 4 normally results in a certain adapting movement, in the case of which the cathode ray tube possibly passes into a position in which its flange 3 is slightly skewed in relation to the device 5, from which position it then has to be moved into the correct, definitive position by the adapting movement. This inevitably results both in the collar 13 of the compensating element 6 being subjected to pressure and in the compensating element 6 being momentarily relieved of loading, said compensating element having to retain its abutment against the flange 3 in the process. The compensating element 6 thus has to follow, as far as possible automatically, a corresponding movement of the flange 3 away from the end sides of the inner tube 9 and of the outer tube 6. This is achieved by the spring element 15 that, in the case of the exemplary embodiment according to FIG. 1, is formed in the manner of a spring bellows which can be compressed to a greater or lesser extent with the build-up of a small amount of spring stressing. The spring stressing utilized here is just large enough for the compensating element 6 to remain in constant contact with the flange 3 without the flange 3 here being subjected to a force which actually influences the position of the cathode ray tube 1 in the covering frame 4.

The thread 14 of the screw 7 is a self-cutting thread which cuts its own thread when the screw 7 is screwed into the inner tube 9, in which case, as has already been explained above, the inner tube 9 is widened. In the case of the exemplary embodiment illustrated, this widening is facilitated to a considerable extent by the two longitudinal slits 16 and 17, the position of which can be gathered from FIG. 2, which illustrates a section along line II—II from FIG. 1. It can be seen from FIG. 2 that the two longitudinal slits 16 and 17 are introduced with radial alignment in the inner tube 9, and extend axially from the end side of the inner tube into the region of the spring element 15, as is indicated by the dashed lines in FIG. 1. On account of the presence of the two longitudinal slits 16 and 17, the inner tube can widen to a considerable extent, when the screw 7 is screwed in, and thus presses against the compensating element 6, which, in turn, is supported on the outer tube 10, with the result that once the screw 7 has been screwed in, on account of the given ratios of friction, the compensating element 6 is clamped firmly in the guide element 8, formed by the inner tube 9 and outer tube 10, the flange 3 thus being provided with a stable abutment via the collar 13 of the compensating element 6. In that position of the screw 7 which is illustrated in FIG. 1, the flange 3 is supported on the inner tube 9 and the outer tube 10 via the compensating element 6, these two tubes, which form the guide part 8, producing a firm connection in relation to the covering frame 4 because the covering frame 4 and the guide part 8 are formed in one piece.

The embodiment according to FIG. 3 provides a variant essentially in the region of the screw 7, which is designed, between the screw head 11 and thread 14, with a shank part 20 which is overdimensioned in relation to the inner tube 9. This shank is a so-called thick shank. Such a thick shank makes it possible for the inner tube 9 to extend to a defined extent when the screw 7 is screwed in.

The functioning of the above exemplary embodiments is based on friction between those surfaces of the inner tube 9 and of the outer tube 10 which are directed toward the compensating element 6 as well as the inner surface and the outer surface of the compensating element 6. If necessary, this friction can be increased by specific measures, an exemplary embodiment of this being illustrated in FIG. 4. In the latter, the inner surface and the outer surface of the compensating element 6 have a specific surface structure, which is produced by the surface being roughened. On account of this roughness 21, the relevant surface of the compensating element 6 wedges, as it were, in the relevant surface of the inner tube 9 and outer tube 10, this giving a particularly pronounced securing function between the guide part 8 and the compensating element 6.

A further measure for improving the clamping between the guide part 8 and compensating element 6 is illustrated in FIG. 5. In the case of this exemplary embodiment, the inner tube 22 is provided with two mutually opposite radial noses 25 which project into corresponding recesses of the compensating element 24. The compensating element 24 likewise has such noses, namely the noses 26, which penetrate into corresponding recesses in the outer tube 23. The radial noses 25 and 26 here are designed with an outwardly decreasing cross section and project into correspondingly shaped recesses, particularly good clamping of the noses 25, 26 in the relevant recesses being provided when the respective inner tube 22 and compensating element 24 expand. The two noses 25 and 26 project essentially in the same radial direction in each case.

The device according to the exemplary embodiment illustrated in FIG. 6, in relation to the exemplary embodiments according to FIGS. 1 and 3, has an additional means of securing the compensating element against displacement in relation to the guide part. This additional securing means comprises the protrusions 30 and 31 which, as constituent parts of the compensating element 27, project through longitudinal slits 32 and 33 in the inner tube 28 and, like the inner tube 28, accommodate the thread 14, which in this case is provided by the self-tapping screw 7. The thread 14 also projects into the remaining part 34 of the inner tube 28, with the result that turns of the thread 14 of the screw 7 are anchored both in this part 34 and in the region of the protrusions 30 and 31. This axial anchoring, provided via the thread 14, of the compensating element 27 in relation to the guide part 8 results in the compensating element 27 being secured particularly firmly on the guide part 8 and thus on the covering frame 4. Furthermore, it is of course the case that the expansion of the inner tube 28, which is brought about by the screw 7, ensures that the inner tube presses against the compensating element 27 from the inside, which results in the same effect as has been described in conjunction with FIGS. 1 and 3.

What is claimed is:

1. Device (5) for fastening a cathode ray tube (1) on a covering frame (4) in which a flat flange (3), which is fastened on the cathode ray tube (1) and is provided with a bore, is screwed to the covering frame (4) by a screw (7), there being arranged between the covering frame (4) and the flange (3) a tubular compensating element (6) which, in a position which is determined by the cathode ray tube (1) butting against the covering frame (4), can be fixed in relation to the covering frame (4) in that the compensating element (6) interacts with a guide part (8) of the covering frame (4), the guide part (8) having an inner tube defining an opening and an outer tube (10) coaxial with the inner tube, with an annular space which is located between the two tubes and is essentially filled by the tubular compensating element (6), characterized in that the inner tube (9) is provided with at least one longitudinal slit (16, 17), and the compensating element (6) can be clamped firmly by the inner tube when the screw (7) is threaded into the inner tube such that the inner tube widens to clamp against the compensating element (6).

2. Device according to claim 1, characterized in that the compensating element (6) is assigned a spring element (15) which presses the compensating element (6) against the flange (3) (FIG. 1).

3. Device according to claim 1 or 2, characterized in that the internal thread is produced by a self-tapping screw (7).

4. Device according to claim 1 or 2, characterized in that the internal thread is preformed with underdimensioning.

5. Device according to claim 1, characterized in that the screw (7) is configured with a shank part (20) which causes the guide part (8) to be widened and is overdimensioned in relation to the guide part (8).

6. Device according to claim 1, characterized in that passing through the at least one slit (32, 33) are one or more respective protrusions (30, 31) which belong to the compensating element (27) and extend into the region of the internal thread and continue the latter.

7. Device according to claim 1, characterized in that the compensating element (6) is provided with one or more longitudinal slits (18, 19).

8. Device according to claim 1, characterized in that the inner tube (22) has radial noses (25) which have an outwardly decreasing cross section and project into corresponding recesses in the compensating element (24).

9. Device according to claim 1, characterized in that the compensating element (27) has radial noses (26) which have an outwardly decreasing cross section and project into corresponding recesses in the outer tube (23) of the guide part.

10. Device according to claim 8 or 9, characterized in that the noses (25) of the inner tube (22) and the noses (26) of the compensating element (24) are oriented essentially in the same radial direction.

11. Device according to claim 1, characterized in that those surfaces of the inner tube (9) and compensating element (6) and also the compensating element (6) and the outer tube (10) which are in contact with one another have surface structures (21) which make relative displacement more difficult.

12. Device according to claim 1, characterized in that the screw has a uniform thread across its length.

* * * * *